United States Patent
Mongin et al.

(10) Patent No.: US 7,183,505 B2
(45) Date of Patent: Feb. 27, 2007

(54) ADAPTING ELEMENT FOR PROGRAMMABLE ELECTRONIC HOLDERS AND USE IN A MULTIPURPOSE PERSONALIZATION MACHINE

(75) Inventors: Hervé Mongin, Trainou (FR); Frédéric Beulet, Meung sur Loire (FR); Benoît Berthe, La Chapelle St Mesmin (FR); Sylvain Auchere, Brou (FR)

(73) Assignee: Datacard Corporation, Minnetonka, MN (US)

( * ) Notice: Subject to any disclaimer, the term of this patent is extended or adjusted under 35 U.S.C. 154(b) by 0 days.

(21) Appl. No.: 10/747,808

(22) Filed: Dec. 30, 2003

(65) Prior Publication Data
US 2005/0034889 A1 Feb. 17, 2005

(30) Foreign Application Priority Data
Aug. 14, 2003 (FR) ................... 03 09972

(51) Int. Cl.
*H01R 13/46* (2006.01)
*H05K 5/00* (2006.01)
*G06F 13/00* (2006.01)
(52) U.S. Cl. ..................... 174/520; 710/303
(58) Field of Classification Search ............. 174/52.1, 174/52.4, 520; 361/737, 681, 684, 686, 685, 361/748; 439/59; 257/679; 710/303
See application file for complete search history.

(56) References Cited

U.S. PATENT DOCUMENTS

| | | | | |
|---|---|---|---|---|
| 5,375,037 A | * | 12/1994 | Le Roux | 361/684 |
| 5,986,891 A | * | 11/1999 | Sugimoto | 361/737 |
| 6,193,163 B1 | * | 2/2001 | Fehrman et al. | 235/488 |
| 6,272,017 B1 | * | 8/2001 | Klatt et al. | 361/737 |
| 6,381,662 B1 | * | 4/2002 | Harari et al. | 710/301 |
| 6,442,639 B1 | * | 8/2002 | McElhattan et al. | 710/303 |
| 6,570,767 B1 | * | 5/2003 | Vapaakoski et al. | 361/737 |

* cited by examiner

*Primary Examiner*—Hung V. Ngo
(74) *Attorney, Agent, or Firm*—Lowe, Hauptman & Berner LLP

(57) ABSTRACT

The present invention concerns an adapting element (1) for at least one programmable electronic holder (2) to be personalized, having a size larger than that of all programmable electronic holders to be personalized and meeting the size accepted by a personalization machine, the adapting element (1) being characterized in that it is provided with a housing (101) of adapted size and shape to house and maintain at least one programmable electronic holder (2), and in that it comprises first communication means (103) enabling it to receive personalization data via contact or contactless link, from a personalization device of a personalization machine, and second communication means (102, 104) enabling it to transmit said personalization data to the programmable electronic holder via contact or contactless link. The present invention also concerns the use of the adapting element (1) in a multipurpose personalization device for programmable electronic holders.

20 Claims, 6 Drawing Sheets

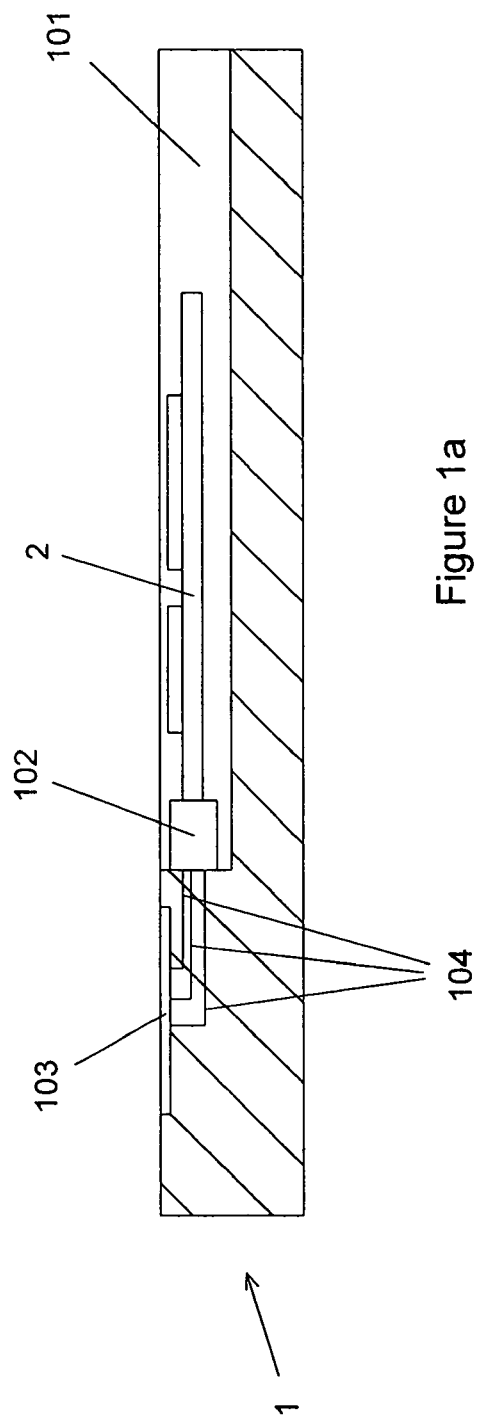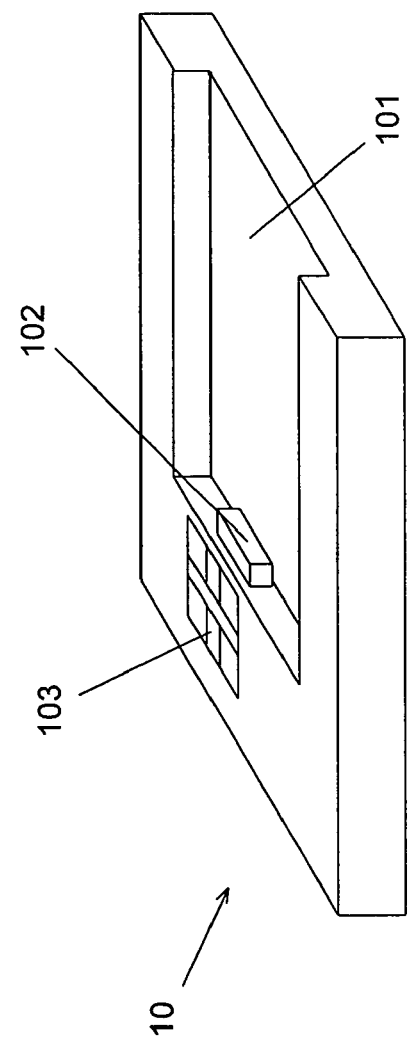
Figure 1a
Figure 1b

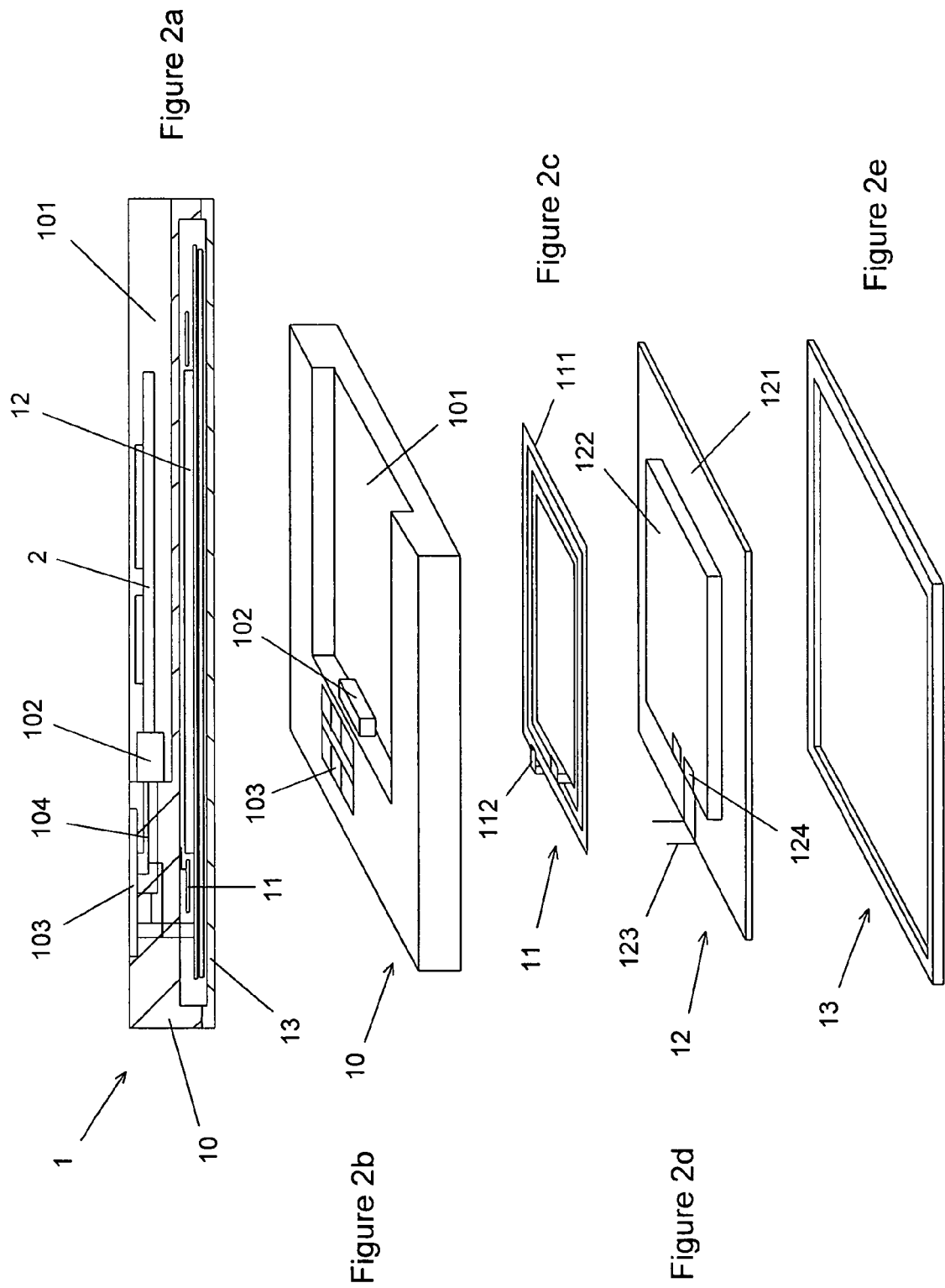

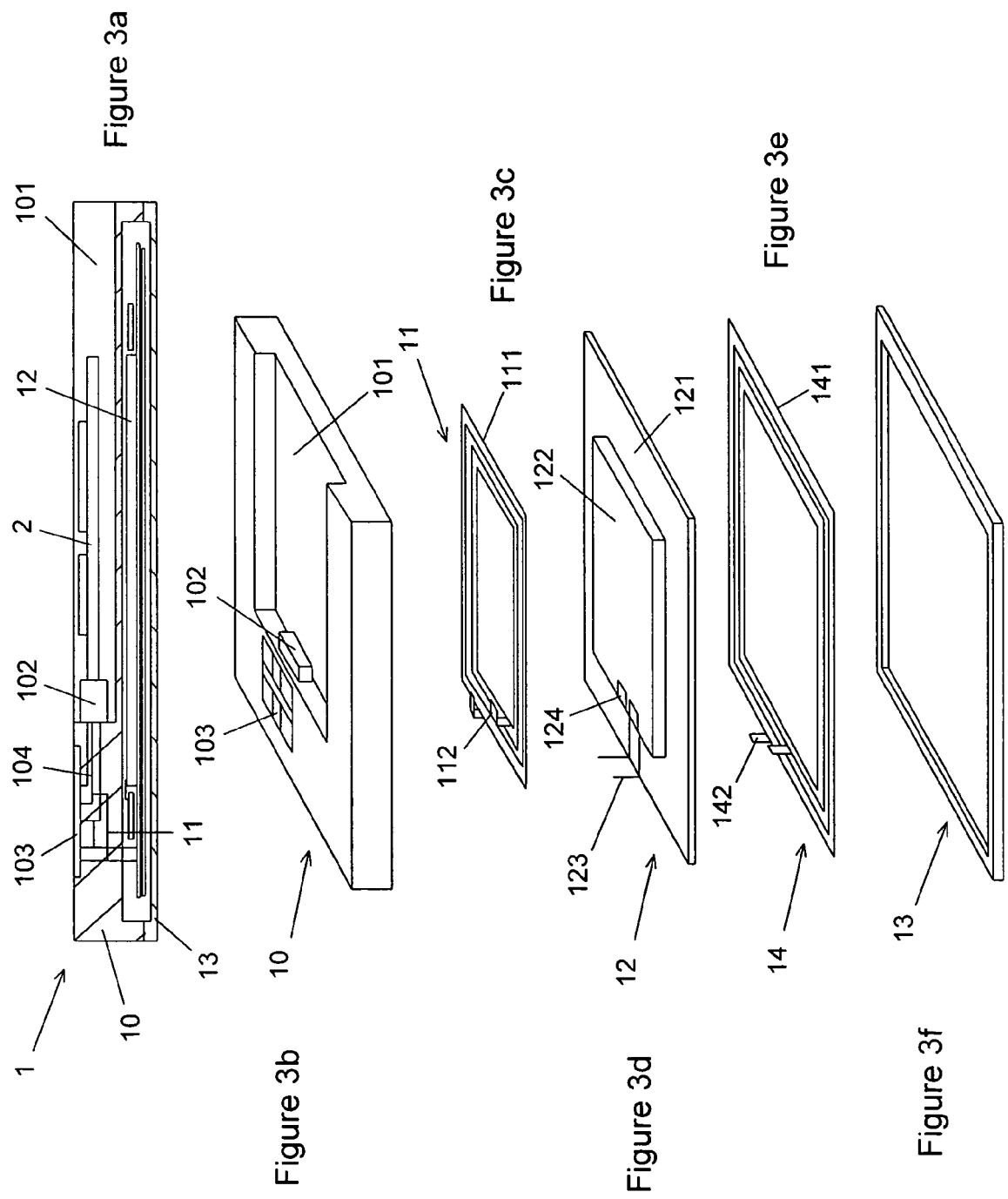

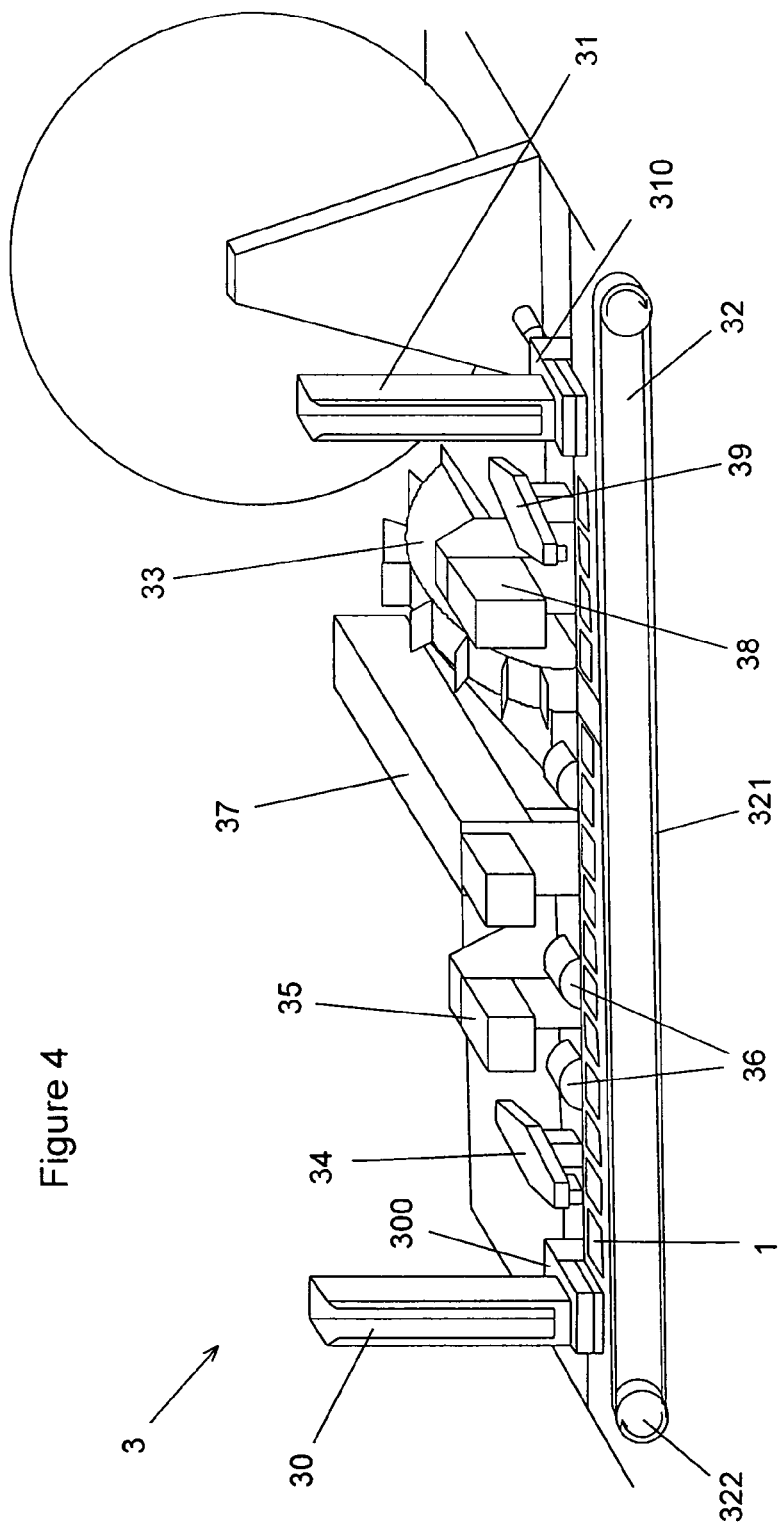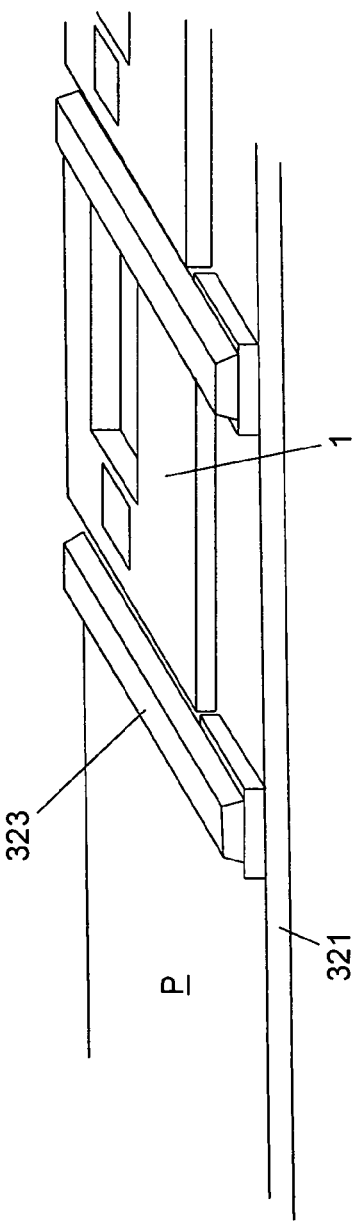

ADAPTING ELEMENT FOR PROGRAMMABLE ELECTRONIC HOLDERS AND USE IN A MULTIPURPOSE PERSONALIZATION MACHINE

CROSS-REFERENCE TO RELATED APPLICATIONS

This application claims priority under 35 U.S.C. §119 based on French Application No. 0309772, filed Aug. 14, 2003, the disclosure of which is hereby incorporated by reference herein in its entirety.

FIELD OF THE INVENTION

The present invention concerns an adapting element for programmable electronic holders of varied types and forms, such as for example ISO standard or plug chip cards, USB keys, PCMCIAs, Compact Flash, Smart Media, Multimedia cards, Memory sticks, SD cards, XD cards, electronic cards, etc . . . each containing programmable memory and a logic sequencer or a microprocessor, and use of the adapting element in a multipurpose personalization machine for programmable electronic holders.

BACKGROUND OF THE INVENTION

Personalization equipments known in the prior art are adapted to personalization of a single form or a single type of programmable electronic holder, necessitating heavy investment by manufacturers of different types of cards, who have to switch their equipment whenever the form or type of holder is modified.

SUMMARY OF THE INVENTION

The purpose of the present invention is to overcome some drawbacks of the prior art by proposing a means for using a single device to personalize all types of programmable electronic holders, which allows to reduce the investment costs and hence to reduce retail prices of the programmable electronic holders.

This purpose is achieved with an adapting element for at least one programmable electronic holder to be personalized, having a surface size larger than that of all programmable electronic holders to be personalized and meeting the size accepted by a personalization machine, the adapting element being characterized in that it is provided with a housing of adapted shape and size to house and maintain at least one programmable electronic holder and in that it comprises first communication means, enabling it to receive personalization data via contact or contactless link from a personalization device of the personalization machine, and second communication means enabling it to transmit said personalization data to the programmable electronic holder via contact or contactless link.

According to another feature, the second communication means are at least one holder connector, able to maintain at least one programmable electronic holder, and electric or optical links, ensuring the link between the holder connector and the first communications means of the adapting element.

According to another feature, the second communication means are an antenna enabling the adapting element to communicate via contactless link with the programmable electronic holder, the antenna being connected to the first communication means of the adapting element and arranged opposite at least one portion of the programmable electronic holder comprising an antenna.

According to another feature, the means connecting the antenna of the adapting element to the first communication means comprise an electronic card containing components for managing communication between the adapting element and the programmable electronic holder.

According to another feature, the first communication means are an antenna, enabling the adapting element to communicate via contactless link with the personalization device of the personalization machine.

According to another feature, a plurality of identical adapting elements according to the invention is used in a multipurpose personalization machine for programmable electronic holders, the personalization machine comprising at least:

- an unstacking system to unstack adapting elements from an input hopper, and a stacking system to stack adapting elements in an output hopper, the input hopper and the output hopper possibly being separate or not,
- an insertion system to insert programmable electronic holders in the adapting elements at the start of the personalization machine, and removal system to remove the programmable electronic holders from the adapting elements at the end of the personalization machine,
- a driving system to drive the adapting elements provided with programmable electronic holders, causing them to transit through the personalization machine, and
- a personalization device, comprising a communication system between a database supplying the personalization data and the programmable electronic holders via the adapting elements, to enable personalization of the programmable electronic holders by programming the personalization data.

According to another feature, the driving system is a tape or belt.

According to another feature, the driving system is a revolving disk.

According to another feature, the insertion and/or removal systems for the programmable electronic holders and/or the stacking and/or unstacking systems for the adapting elements are manual.

According to another feature, the personalization device of the personalization machine is a cylinder, wheel or linear elevator comprising a plurality of connectors each connecting with the contact lug of an adapting element.

BRIEF DESCRIPTION OF THE DRAWINGS

Other features and advantages of the present invention will become more clearly apparent on reading the following description given with reference to the appended drawings in which:

FIGS. 1a, 2a and 3a (and new FIG. 4a) shows a longitudinal section view of the adapting element according to three embodiments of the invention respectively, a programmable electronic holder being in position inside the adapting element, FIG. 1b shows a perspective view of the adapting element according to the embodiment in FIG. 1a, FIGS. 2b to 2e show a perspective view of the respective different parts of the adapting element respectively according to the embodiment in FIG. 2a, FIGS. 3b to 3f show a perspective view of the different parts of the adapting element respectively according to the embodiment in FIG. 3a, FIG. 4 shows a perspective view of a personalization machine according to a first embodiment of the invention, FIG. 5 shows a detailed perspective view of FIG. 4.

DETAILED DESCRIPTION OF THE PREFERRED EMBODIMENTS

Figure 6:
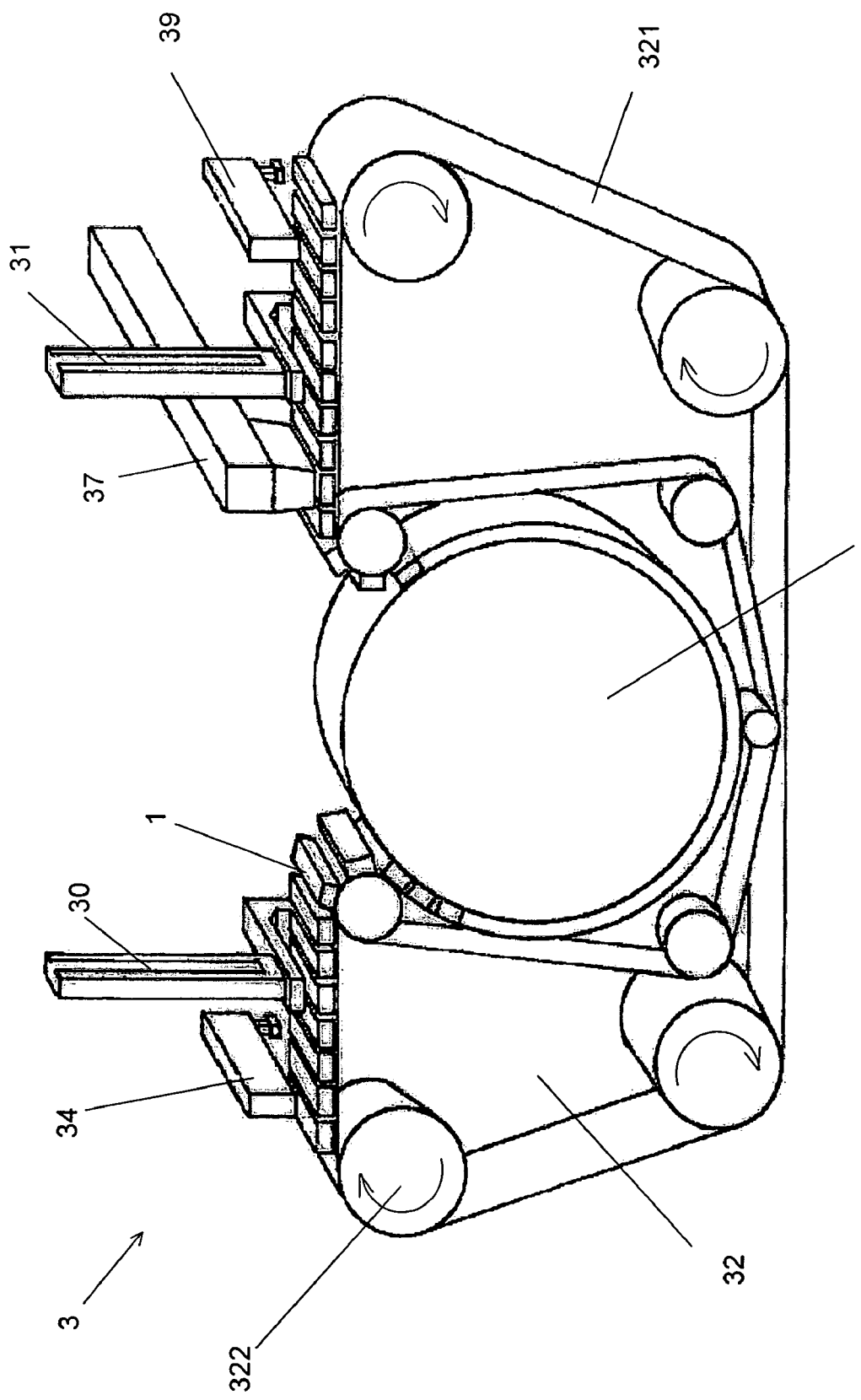
FIG. 6 shows a perspective view of a personalization machine according to a second embodiment of the invention.

In a first embodiment shown in particular in FIGS. 1a and 1b, the adapting element (1) of the invention consists of a single unit 10 provided with a housing 101 of suitable shape and size to house one type of programmable electronic holder 2. At least one holder connector 102 allows to maintain at least one programmable electronic holder 2 in housing 101. This holder connector 102 is connected to a contact lug 103 via electric or optical links 104. In this embodiment, personalization data arrives from a personalization device 33 of a personalization machine 3 to contact lug 103 of the adapting element by electric or optical link and is transmitted to the programmable electronic holder 2 by electric or optical link via the holder connector 102.

In a second embodiment, shown in particular in FIGS. 2a to 2e, the adapting element 1 of the invention consists of four elements 10, 11, 12, 13. A first element 10 is provided with a housing 101 of suitable shape and size to house one type of programmable electronic holder 2. At least one holder connector 102 allows to maintain at least one programmable electronic holder 2 in housing 101. This holder connector 102 is connected to a contact lug 103 by electric or optical links 104. A second 11 and a third 12 element are arranged between the first element 10 and a bottom part 13. The third element 12 is an electronic card 121 containing components 122 for processing signals and communications between the programmable electronic holder and a personalization device 33 of a personalization machine 3. Components 122 are connected by electric or optical links 123 to contact lug 103 of first element 10. The second element 11 is an antenna 111 allowing the adapting element 1 to power and communicate by contactless link with the programmable electronic holder located in first element 10. Antenna 111 is connected to the components 122 of the third element 12 via lugs 112 coming into contact with contact stucks 124 of the third element 12. This antenna 111 is arranged opposite at least one portion of the programmable electronic holder containing an antenna. The electronic card 12 allows to manage communications between adapting element 1 and programmable electronic holder 2. In this embodiment, personalization data arrives from personalization device 33 of personalization machine 3 to contact lug 103 of adapting element 1 by contact link and is transmitted to programmable electronic holder 2 either by contact link via holder connector 102 or by contactless link via antenna 111.

In a third embodiment, shown in particular in FIGS. 3a to 3f, the adapting element 1 of the invention consists of five elements (10, 11, 12, 13, 14). The four first elements (10, 11, 12, 13) are similar to those described for the second embodiment. The fifth element 14 is an antenna 141 arranged between the third element 12 and the bottom part 13 enabling the adapting element 1 to communicate by contactless link with a personalization device 33 of a personalization machine 3. Antenna 141 of the fifth element 14 is connected to the components 122 of the third element 12 via lugs 142. In this embodiment, personalization data arrives from personalization device 33 of personalization machine 3 to contact lug 103 of the adapting element either by contact link via contact lug 103 or by contactless link via antenna 141 (FIG. 3e) of fifth element 14 and is transmitted to the programmable electronic holder 2 either by contact link via holder connector 102 or by contactless link via antenna 111 (FIG. 3c) of second element 11. In this manner the programmable electronic holder can be personalized during all operations performed by personalization machine 3 without waiting for the adapting element to be in contact with the personalization device 33 of the personalization machine 3 via contact link. In this embodiment, the personalization machine 3 can emit several personalization data items each addressed to different programmable electronic holders. The electronic card 121 provided with the components 122 then enables sorting of data, by means of addresses for example, determining those which are intended for the programmable electronic holder(s) it carries, and only transmitting to it or them the data each is intended to receive. During these transmission operations by contactless link, only non-sensitive information is emitted, which is non-encrypted. If sensitive information is emitted by the antennas it is previously encoded. The electronic card 121 provided with the components 122 will incorporate a decoding algorithm for signals derived from the personalization machine 3, and a coding algorithm for signals emitted towards the programmable electronic holder 2. The encryption/decryption principle used between the personalization machine 3 and the adapting element 1 may be different or not from the encryption/decryption principle used between the adapting element 1 and the programmable electronic holder 2.

In one variant of embodiment of the second (FIGS. 2a to 2e) and third (FIGS. 3a to 3f) embodiments of the invention, adapting element 1 does not comprise an electronic card 12 and the antennas (111, 141) are directly connected to the contact lug 103 of the first element 10 to receive personalization data to be transmitted to the programmable electronic holder 2 directly form personalization machine 3.

In all these embodiments, the size of the adapting element 1 is greater, at least in width and depth but not in thickness, than that of all programmable electronic holdiers to be personalized and meets the size accepted by personalization machines 3. Moreover, the holder connector 102 is adapted to the type of programmable electronic holder 2 to be personalized. In this way, it is possible with a single personalization machine 3 to personalize all types of programmable electronic holders by simply changing the adapting element 1 which is of standard size adapted to the personalization machine 3 and is chosen in relation to the shape and type of programmable electronic holder to be personalized.

Therefore, the programmable electronic holders to be personalized may be different in size, may have different external connections, may use a contact or contactless communication protocol or both, may meet the protocol of ISO 7816 chip cards or any other own communication protocol.

Each adapting element 1 can house one or several programmable electronic holders 2, their number being limited by the size of the adapting element, which depend on the personalization machine on which they will be used and on the connections of adapting element 1.

The adapting element according to the invention can be used on different types of personalization machines 3. It allows to provide each personalization machine with a standard mechanical and electric interface irrespective of the type of programmable electronic holder which is to be personalized. Each personalization machine can therefore house all types of programmable electronic holders without undergoing any change in its structure.

Each personalization machine 3 comprises at least:

an unstacking system 300 to unstack the adapting elements 1 from an input hopper 30, and a stacking system 310 to stack the adapting elements 1 in an output hopper 31, an insertion system 34 to insert the programmable electronic holders 2 in the adapting elements 1 at the start of the personalization machine 3, and a removal system 39 to remove the programmable electronic holders 2 from the adapting elements 1 at the end of the personalization machine 3, a driving system 32 to drive the adapting elements 1 so as to bring them successively to each station of the personalization machine 3, and a personalization device 33 comprising a communication system between a database supplying the personalization data and the programmable electronic holders 2 via the adapting elements 1, to enable personalization of the programmable electronic holders by programming personalization data in the programmable memory of the programmable electronic holders.

In one variant of embodiment, the insertion and removal of the programmable electronic holders in and from the adapting elements may be manual. Similarly for unstacking and stacking the adapting elements. For example in the particular case of unit machines permitting manual production of small quantities of programmable electronic holders 2. In this case there is no conveying system or print system, simply a single-station personalization device.

In another variant of embodiment, input 30 and output 31 hoppers may be multiple and contain all the adapting element types required for personalizing the desired programmable electronic holders, the personalization machine then being fitted with an electronic module for determining the type of adapting elements and choosing the desired type of adapting element.

In another variant of embodiment, input hopper 30 and output hopper 31 may be merged in a single hopper, for example for machines recycling the adapting elements.

The adapting element 1 according to the invention is parallelepipedic for example to facilitate its unstacking and stacking in input hopper 30 and output hopper 31 and its positioning on the driving system of the personalization machine 3.

In a first embodiment, shown in particular in FIG. 4, the driving system 32 for the adapting elements 1 is a substantially horizontal continuous conveyor tape 321 held taut between two drive pulleys 322. The adapting elements 1 are unstacked from input hopper 30 onto tape 321 and travel along a plane P along the personalization machine 3 as far as stacking hopper 31, the adapting elements 1 being separated from one another by a separator 323 as shown in FIG. 5. Between the two hoppers 30, 31, the adapting elements successively pass through:

an insertion station 34 to insert the programmable electronic holders 2 in the adapting elements 1, an inspection station 35 to inspect positioning of the programmable electronic holders 2 in the adapting elements 1, this inspection station being located between two turnover stations 36 for turning over the adapting elements 2.

a laser etching and/or inkjet printing station 37 to etch of print the programmable electronic holders 2, the personalization device 33 such as described in French patents FR 2 746 531 and FR 2 766 945 by Gilles Leroux, an identification station 38 to identify the programmable electronic holders 2, for example a camera or bar code reader if the programmable electronic holders are provided with a bar code, and a removal station 39 to remove the programmable electronic holders 2 from the adapting elements 1.

The insertion system 34 (respectively removal system 39) to insert (respectively remove) the programmable electronic holders 2 into (respectively from) the adapting elements 1 consists for example of an arm provided with a system for gripping the programmable electronic holders, which revolves about 180° around its base to pick out (respectively put back) the programmable electronic holders on a dispenser (respectively a delivery area) which dispenses programmable electronic holders and resumes its position to deposit them in (respectively take them from) the adapting elements.

Personalization device 33, at least when the adapting element has contact communication with the personalization system, consists of at least one cylinder in which each compartment can house and maintain one adapting element 1. The contact lug 103 of each adapting element 1 is connected to the cylinder compartment in which it is housed, so that the electronics of the personalization device 33, whether loaded or not in the cylinder, transmit to the programmable electronic holder(s) carried by said adapting element the personalization data required for personalizing said holder(s). The personalization device 33 may comprise several cylinders, arranged one after the other, to increase the personalization time available on the personalization machine 3. In this case, each cylinder has a gateway station, called "through station" which enables the adapting elements to pass from one cylinder to another. In this way, when the first cylinder is fully loaded, it positions itself on its gateway station. The adapting elements which pass through this station then fill the second cylinder and so on. Once the last cylinder is filled the adapting elements of the first loaded cylinder are unloaded by passing through the gateway stations of the following cylinders until the last loaded cylinder is completely emptied.

In a second embodiment shown in FIG. 6 the driving system 32 to drive the adapting elements 1 is a continuous belt 321 held taut between a plurality of drive pulleys 322. In this embodiment, the adapting elements 1 are unstacked from input hopper 30 onto the belt 321 and travel over the entire belt 321 until the user of the personalization machine decides to change the type of adapting elements to be used, for example if he wishes to personalize another type of programmable electronic holders. Therefore each adapting element may perform a plurality of rounds of the device before being stacked in the output hopper 31. For this purpose the adapting elements 1 are maintained on the belt 321 by maintaining means (not shown). Once the belt is filled with adapting elements, programmable electronic holders are inserted in the adapting elements 1 at an insertion station 34 to insert the programmable electronic holders 2 in the adapting elements 1. The adapting elements 1 then pass through the personalization device 33 which consists of a wheel fitted with a plurality of connectors each setting up a contact link with an adapting element to transmit the personalization data generated by the electronics which may or may not be loaded on the wheel. Subsequently, the adapting elements 1 pass through a laser etching and/or inkjet printing station 37 to etch or print the programmable electronic holders 2 and through a removal station 39 to remove the programmable electronic holders 2 from the adapting elements 1, before the adapting elements are lowered, maintained in place on the belt, to continue their round.

Figure 7:
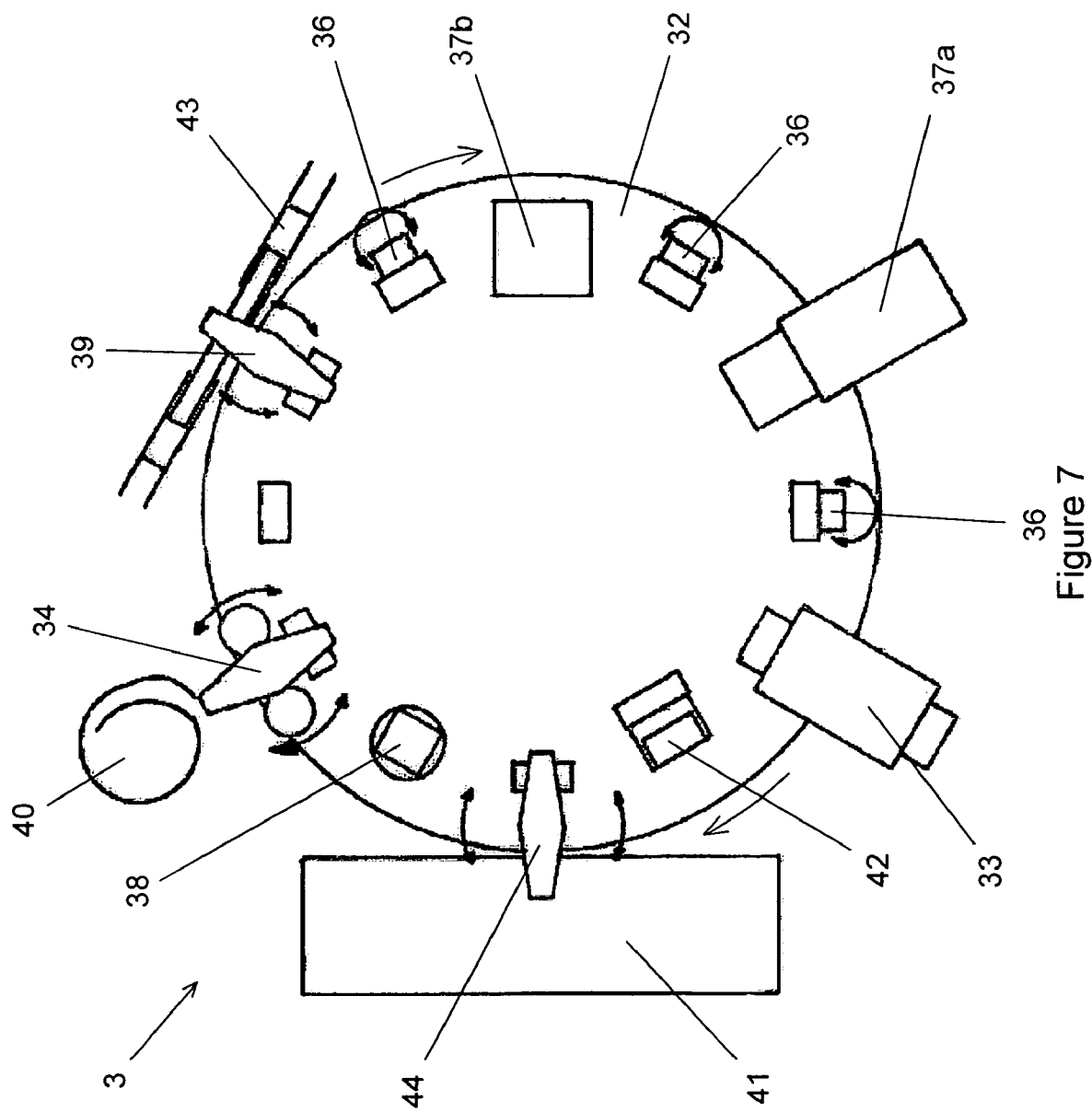
FIG. 7 shows a top view of a personalization machine according to a third embodiment of the invention.

In the third embodiment shown in FIG. 7 the driving system 32 to drive the adapting elements 1 is a revolving disk. In this embodiment, the adapting elements 1 are fixed on the revolving disk, close to its edge, until the user of the personalization machine decides to change the type of adapting elements to be used. Therefore each adapting element makes a rotation around the axis of the revolving disk and successively passes through:

- an insertion station 34 to insert the programmable electronic holders 2 in adapting elements 1 from a dispenser 40,
- a laser etching or inkjet printing station 37b to etch or print the programmable electronic holders 2,
- a laser etching or inkjet printing station 37a to etch or print the programmable electronic holders 2,
- the communication system 33,
- an adhesive high pressure elevator 42
- an encarding station 41 to encard the programmable electronic holders 2, taken by a manipulator 44 on the personalization machine,
- an identification station 38 to identify the programmable electronic holders 2, for example a camera or bar code reader if the programmable electronic holders are provided with a bar code,
- a removal station 39 to remove the programmable electronic holders 2 from the adapting elements 1 sending them towards a storage belt 43.

Turnover stations 36 to turn over the adapting elements are arranged respectively between the insertion station 34 and print station 37b, between the two print stations 37a, 37b and between the print station 37a and the personalization device 33.

In a variant of the second (FIG. 6) and third (FIG. 7) embodiment, the input hopper 30 and output hopper 31 may be merged. For example, at the start of personalization production of programmable electronic holder 2, the hopper unstacks a sufficient number of adapting elements 1 to fill the personalization machine 3. During production, the adapting elements 1 circulate in the machine without passing through the hopper. At the end of production the adapting elements arranged on the personalization machine 3 are re-stacked in the same hopper. Several dual-function hoppers can therefore contain different types of adapting elements 1.

In a variant of embodiment of the first (FIG. 4) and third (FIG. 7) embodiments, the personalization device 33 is a linear elevator similar to the one described in patent application EP 1 076 324.

The adapting elements 1 being provided with a contact lug 103 identical to that of the chip cards, it is possible to adapt existing personalization machines by re-sizing the different parts of the machine so that they can house adapting elements 1 instead of chip cards.

It would be obvious for persons skilled in the art that the present invention enables embodiments in numerous other specific forms without departing from the field of application of the invention as claimed. Therefore the above embodiments are to be considered as illustrations but can be modified within the field defined by the scope of the enclosed claims, and the invention is not to be limited to the details given above.

The invention claimed is:

1. An adapting element for at least one programmable electronic holder, the adapting element having a surface size larger than that of all the programmable electronic holders, the programmable electronic holder being arranged to be personalized in a personalization machine, the adapting element being of a size to enable it to be received by the personalization machine , the size of the adapting element enabling the adapting element to be driven in the personalization machine including a transportation system for transferring the adapting elements to a plurality of personalization stations, the adapting element being of a size to enable it to be received by the personalization machine, the size of the adapting element enabling the adapting element to be moved on the transportation system, the adapting element including (a) a housing having a shape and size to house and hold in place at least one of the programmable electronic holders of a given size and shape, (b) a receiver arrangement for enabling the adapting element to receive personalization data from a personalization device of the personalization machine via a contact or contactless link, and (C) a transmitter arrangement for enabling the adapting element to transmit said personalization data to the at least one programmable electronic holder via a contact or contactless link.

2. The adapting element according to claim 1, wherein the transmitter arrangement includes at least one holder connector, able to hold in place at least one programmable electronic holder, and electric or optical links, ensuring a link between the holder connector and the receiver arrangement.

3. The adapting element according to claim 1, wherein the transmitter arrangement includes an antenna which allows the adapting element to communicate via a contactless link with the programmable electronic holder, the antenna being connected to the receiver arrangement and arranged opposite at least a portion of the programmable electronic holder comprising an antenna.

4. The adapting element according to claim 3, wherein the antenna is connected to the receiver arrangement includes an electronic card having components for managing communication between the adapting element and the programmable electronic holder.

5. The adapting element according to claim 1, wherein the receiver arrangement includes an antenna for enabling the adapting element to communicate via a contactless link with the personalization device of the personalization machine.

6. In combination, a plurality of identical adapting elements, each of each adapting element being for at least one programmable electronic holder, each adapting element having a surface size larger than that of all the programmable electronic holders, the programmable electronic holder being arranged to be personalized in a personalization machine, each adapting element being of a size to enable it to be received by the personalization machine, the size of each adapting element enabling each adapting element to be driven in the personalization machine, each adapting element including (a) a housing having a shape and size to house and hold in place at least one of the programmable electronic holders of a given size and shape, (b) a receiver arrangement for enabling each adapting element to receive personalization data from a personalization device of the personalization machine via a contact or contactless link, and (c) a transmitter arrangement for enabling each adapting element to transmit said personalization data to the at least one programmable electronic holder via a contact or contactless link, each of the adapting elements being in a multipurpose personalization machine for personalized programmable electronic holders, the personalization machine including:

an unstacking system to unstack the adapting elements from an input hopper and a stacking system to stack adapting elements in an output hopper, the input hopper and the output hopper being combined or constituting separate components, an insertion system to insert the programmable electronic holders in the adapting elements at the start of operation of the personalization machine, and a removal system to remove the programmable electronic holders from the adapting elements at the end of operation of the personalization machine, a driving system to drive the adapting elements including the programmable electronic holders and causing the adapting elements to transit through the personalization machine, and a personalization device comprising a communication system between a database for supplying the personalization data and the programmable electronic holders via the adapting elements to enable personalization of the programmable electronic holders by programming the personalization data.

7. The combination according to claim 6, wherein the driving system includes a tape or belt.

8. The combination according to claim 6, wherein the driving system includes a revolving disk.

9. The combination according to claim 6, wherein the insertion and/or removal systems for the programmable electronic holders and/or the stacking system and/or unstacking systems for the adapting elements are manual.

10. The combination according to claim 6, wherein the personalization device of the personalization machine includes a cylinder, wheel or linear elevator comprising a plurality of connectors for connecting with contact lugs of the adapting elements.

11. In combination, a plurality of identical adapting elements, each of the adapting elements being in a multipurpose personalization machine for personalized programmable electronic holders, each of the adapting elements having a surface size larger than that of all programmable electronic holders to be personalized and meeting the size accepted by a personalization machine, the adapting element including (a) a housing of adapted shape and size to house and maintain at least one programmable electronic holder, (b) a receiver arrangement for enabling the adapting element to receive personalization data from a personalization device of the personalization machine via contact or contactless link, and (c) a transmitter arrangement for enabling the adapting element to transmit said personalization data to the programmable electronic holder via contact or contactless link, the personalization machine comprising at least:

an unstacking system to unstack adapting elements from an input hopper and a stacking system to stack adapting elements in an output hopper, the input hopper and the output hopper possibly being separate or not, an insertion system to insert programmable electronic holders in the adapting elements at the start of operation of the personalization machine, and a removal system to remove the programmable electronic holders from the adapting elements at the end of operation of the personalization machine, a driving system to drive adapting elements including programmable electronic holders and causing the adapting elements to transit through the personalization machine, and a personalization device comprising a communication system between a database for supplying the personalization data and the programmable electronic holders via the adapting elements to enable personalization of the programmable electronic holders by programming the personalization data.

12. The combination according to claim 11, wherein the driving system includes a tape or belt.

13. The combination according to claim 11, wherein the driving system includes a revolving disk.

14. The combination according to claim 11, wherein at least one of the insertion and removal systems for the programmable electronic holders is respectively arranged to provide manual insertion and removal, and at least one of the stacking system and unstacking systems for the adapting elements is respectively arranged to provide manual stacking and unstacking.

15. The combination according to claim 11, wherein the personalization device of the personalization machine includes a cylinder, wheel or linear elevator comprising a plurality of connectors for connecting with contact lugs of the adapting elements.

16. An adapting element for a personalization machine comprising a transportation system for transferring the adapting elements to a plurality of personalization stations, each adapting element having a surface size larger than that of all of the programmable electronic holders to be personalized and being of a size (a) to enable the adapting elements to be received by the personalization machine, and (b) to enable the adapting elements to be moved on the transportation system of the personalization machine, the adapting element including: (a) a housing having a shape and size to house and hold in place plural programmable electronic holders of different given sizes and shapes at different times, (b) a first contact or contactless communication device for enabling the adapting element to receive personalization data from a personalization device of the personalization machine, and (c) a second contact or contactless communication device for enabling the adapting element to transmit said personalization data to the at least one programmable electronic holder for enabling personalization of the programmable holders.

17. The element according to claim 16, in combination with a system including the personalization machine and a driving system, the driving system including a tape or belt for driving plurality of the adapting elements to and from the personalization device.

18. An adapting element for a personalization machine to enable personalization of programmable electronic holders, the adapting element having a surface size larger than that of all of the programmable electronic holders to be personalized and being of a size (a) to enable the adapting element to be received by the personalization machine, and (b) to enable the adapting element to be driven in the personalization machine, the adapting element including: (a) a housing having a shape and size to house and hold in place plural programmable electronic holders of different given sizes and shapes at different times, (b) a first contact or contactless communication device for enabling the adapting element to receive personalization data from a personalization device of the personalization machine, and (c) a second contact or contactless communication device for enabling the adapting element to transmit said personalization data to the at least one programmable electronic holder, the adapting element being in combination with a system including the personalization machine and a driving system, the driving system including a revolving disk for driving a plurality of the adapting elements to and from the personalization device.

19. An adapting element for a personalization machine to enable personalization of programmable electronic holders, the adapting element having a surface size larger than that of all of the programmable electronic holders to be personalized and being of a size (a) to enable the adapting element to be received by the personalization machine, and (b) to enable the adapting element to be driven in the personalization machine, the adapting element including: (a) a housing having a shape and size to house and hold in place plural programmable electronic holders of different given sizes and shapes at different times, (b) a first contact or contactless communication device for enabling the adapting element to receive personalization data from a personalization device of the personalization machine, and (c) a second contact or contactless communication device for enabling the adapting element to transmit said personalization data to the at least one programmable electronic holder, the adapting element being in combination with (a) the personalization machine, (b) a system for driving a plurality of the elements to and from the personalization device, (c) a system for inserting the elements on the driving system, (d) a system for removing the elements from the driving system, (e) a system for stacking the elements on the driving system, and (f) a system for unstacking the elements from the driving system, at least one of the systems (c), and (d) being respectively arranged for manual insertion and removal of the elements, at least one of the systems (e) and (f) being respectively arranged for manual stacking and unstacking of the elements.

20. An adapting element for a personalization machine to enable personalization of programmable electronic holders, the adapting element having a surface size larger than that of all of the programmable electronic holders to be personalized and being of a size (a) to enable the adapting element to be received by the personalization machine, and (b) to enable the adapting element to be driven in the personalization machine, the adapting element including: (a) a housing having a shape and size to house and hold in place plural programmable electronic holders of different given sizes and shapes at different times, (b) a first contact or contactless communication device for enabling the adapting element to receive personalization data from a personalization device of the personalization machine, and (c) a second contact or contactless communication device for enabling the adapting element to transmit said personalization data to the at least one programmable electronic holder, the adapting element being in combination with the personalization machine, the personalization device of the personalization machine including (a) a cylinder, wheel or linear elevator for carrying a plurality of the elements at one time , and (b) a plurality of connectors for connecting with contact lugs of the adapting elements.

* * * * *